United States Patent
Walsh

(10) Patent No.: US 10,891,863 B2
(45) Date of Patent: Jan. 12, 2021

(54) VEHICLE AND TRIP DATA NAVIGATION FOR COMMUNICATION SERVICE MONITORING USING MAP GRAPHICAL INTERFACE

(71) Applicant: ViaSat, Inc., Carlsbad, CA (US)

(72) Inventor: Richard G Walsh, Bonsall, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 16/020,032

(22) Filed: Jun. 27, 2018

(65) Prior Publication Data

US 2020/0005639 A1    Jan. 2, 2020

(51) Int. Cl.
| | | |
|---|---|---|
| G08G 1/13 | (2006.01) | |
| H04W 4/40 | (2018.01) | |
| G06F 16/29 | (2019.01) | |
| G07C 5/00 | (2006.01) | |
| H04W 8/24 | (2009.01) | |

(52) U.S. Cl.
CPC .............. *G08G 1/13* (2013.01); *G06F 16/29* (2019.01); *G07C 5/008* (2013.01); *H04W 4/40* (2018.02); *H04W 8/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,356,393 | B1* | 4/2008 | Schlatre | G06Q 10/06 701/29.3 |
| 2007/0094056 | A1* | 4/2007 | Kang | G06Q 50/14 705/5 |
| 2007/0112487 | A1 | 5/2007 | Avery | |
| 2007/0294033 | A1* | 12/2007 | Osentoski | G08G 1/205 701/29.3 |

(Continued)

FOREIGN PATENT DOCUMENTS

EP    2377101 A1    10/2011

OTHER PUBLICATIONS

International Search Report and the Written Opinion of the Internationalsearching Authority for PCT/US2019/038129, dated Sep. 24, 2019.

*Primary Examiner* — Nabil H Syed
*Assistant Examiner* — Cal J Eustaquio
(74) *Attorney, Agent, or Firm* — Chang & Hale LLP

(57) ABSTRACT

An apparatus or system for monitoring a network communication system onboard a vehicle includes control circuitry configured to obtain location data for a plurality of vehicles within a geographic area, and generate graphical interface data representing a map of the geographic area and vehicle icons at positions on the map corresponding to respective geographic locations of associated vehicles. In response to user input associated with a vehicle icon, graphical interface data is generated representing a vehicle identifier and a trip identifier. In response to user input associated with the vehicle identifier, graphical interface data is generated rep- (Continued)

resenting the set of vehicle data, including communication service data for a communication service provided on the vehicle. In response to user input associated with the trip identifier, graphical interface data is generated representing the set of trip data, including communication service data related to a trip.

31 Claims, 9 Drawing Sheets

(56) References Cited

U.S. PATENT DOCUMENTS

| | | | |
|---|---|---|---|
| 2009/0318137 A1* | 12/2009 | Kauffman | H04L 45/42 455/428 |
| 2012/0077533 A1* | 3/2012 | Irmer | H04W 28/16 455/509 |
| 2014/0058591 A1* | 2/2014 | Schoonveld | G08G 5/0095 701/3 |
| 2014/0274176 A1* | 9/2014 | Baqar | H04B 7/18506 455/501 |
| 2015/0228196 A1* | 8/2015 | Sampigethaya | B64D 43/00 701/120 |
| 2016/0057032 A1* | 2/2016 | Tieftrunk | G01C 21/00 701/533 |
| 2016/0204882 A1* | 7/2016 | Kuo | H04B 17/19 455/67.14 |
| 2017/0126521 A1 | 5/2017 | Lala | |
| 2018/0054366 A1 | 2/2018 | Hashmi | |
| 2018/0164123 A1 | 6/2018 | Pineo | |

* cited by examiner

VEHICLE DATA

500

Aircraft Health — 502

| Aircraft Detail | 30 Day Summary | | |
|---|---|---|---|
| XXXX ⌄ <br> Tail ID — 504 | X — 506 <br> Cases Opened | — 508 <br> Equipment Swaps | X — 510 <br> Passenger Contacts |

See More aircraft details ⌄

Line Replaceable Units: (9) — 512

| Component | | Status | | Hardware | | Software | Firmware |
|---|---|---|---|---|---|---|---|
| Name ▲ | ID # ◆ | Status ◆ | Last Status ◆ | Part # ◆ | Revision ◆ | Revision ◆ | Revision ◆ |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |
| XXXX | XXXX | ⊘ | 20Mar2018 08:59 AEDT | XXXX | XXXX | XXXX | XXXX |

① Error  ⚠ Impaired  ⊘ Normal  ❓ Unknown

Results 1 - 9 of 9

Current Cases: (9) — 522

| Case | | | | Progress | | | |
|---|---|---|---|---|---|---|---|
| ID # ▼ | Type ◆ | Category ◆ | Subject ◆ | Priority ◆ | Status ◆ | Created ◆ | Last Status ◆ |
| XXXX | XXXX | XXXX | XXXX | XXXX | Waiting on Customer | 18Mar2018 | 18Mar2018 |
| XXXX | XXXX | XXXX | XXXX | XXXX | Resolved/Recovered | 18Mar2018 | 18Mar2018 |

Results 1 - 2 of 2          Previous | 1 | Next

FIG. 5

VEHICLE AND TRIP DATA NAVIGATION FOR COMMUNICATION SERVICE MONITORING USING MAP GRAPHICAL INTERFACE

BACKGROUND

The present disclosure relates generally to mobile communications systems, and more particularly to monitoring communication systems onboard vehicles.

As high-performance networking capabilities have been made available to mobile platforms, managing network performance and user satisfaction for these networks has increased in complexity. Therefore, improved methods of characterizing the performance of network communication services to mobile platforms are needed.

SUMMARY

In some implementations, the present disclosure relates to an apparatus for monitoring a network communication system onboard a vehicle. The apparatus comprises a network interface and control circuitry. The control circuitry is configured to obtain location data indicating geographic locations of a plurality of vehicles within a geographic area. The control circuitry is further configured to generate first graphical interface data representing a map of the geographic area and a plurality of vehicle icons. Each of the plurality of vehicle icons is at a position on the map corresponding to a respective geographic location of one of the plurality of vehicles. The control circuitry is further configured to, in response to receiving an indication of a first user input associated with a first vehicle icon of the plurality of vehicle icons, generate second graphical interface data. The second graphical interface represents a vehicle identifier and a trip identifier. The vehicle identifier identifies a first vehicle of the plurality of vehicles associated with the first vehicle icon. The trip identifier identifies a trip associated with the first vehicle. The control circuitry is further configured to establish a network connection with an onboard server of the first vehicle using the network interface and receive a set of vehicle data from the onboard server via the network connection. The control circuitry is further configured to receive a set of trip data associated with a communication service provided by the onboard server on the first vehicle during the trip. The control circuitry is configured to, in response to receiving an indication of a second user input associated with the vehicle identifier, generate third graphical interface data representing the set of vehicle data. The control circuitry is further configured to, in response to receiving an indication of a third user input associated with the trip identifier, generate fourth graphical interface data representing the set of trip data.

In certain embodiments, the set of vehicle data comprises unit status data for one or more devices used to provide the communication service onboard the first vehicle. The one or more devices may comprise one or more of a wireless access point, an antenna power supply, an antenna, a modem, a transceiver, and a server. In some embodiments, a visual feature of the first vehicle icon is based on the unit status data. The visual feature may comprise at least one of a color and a shape of the first vehicle icon. In some embodiments, the control circuitry is further configured to aggregate the unit status data for the one or more devices. The second graphical interface data may represent a vehicle health icon and a visual feature of the vehicle health icon may be based on the aggregated unit status data.

In some embodiments, the set of trip data comprises travel route data for the first vehicle. For example, the travel route data may comprise one or more service metrics of the communication service provided on the first vehicle during the trip. The one or more service metrics may include one or more of a number of users, a connectivity status, a data rate, a data usage value, a ping latency, a ping success value, and a load time.

In some embodiments, the set of vehicle data comprises performance data associated with the communication service provided on the first vehicle during one or more previous trips of the first vehicle. In some embodiments, at least one visual feature of the first vehicle icon indicates a status level of the performance data. For example, the status level may be based on one or more of a data rate, a signal quality value, a latency, and a packet loss rate of the communication service.

In certain embodiments, the vehicle identifier is associated with a first hyperlink and the trip identifier is associated with a second hyperlink. The control circuitry may be further configured to iteratively perform, for the plurality of vehicles, obtaining of respective vehicle data.

In some implementations, the present disclosure relates to a method of monitoring a network communication service. The method comprises obtaining location data indicating geographic locations of a plurality of vehicles within a geographic area and generating first graphical interface data representing a map of the geographic area and a plurality of vehicle icons. Each of the plurality of vehicle icons is at a position on the map corresponding to a respective geographic location of one of the plurality of vehicles. The method further comprises, in response to receiving a first user input associated with a first vehicle icon of the plurality of vehicle icons, generating second graphical interface data representing a vehicle identifier identifying a first vehicle of the plurality of vehicles associated with the first vehicle icon and a trip identifier for a trip associated with the first vehicle. The method further comprises establishing a network connection with an onboard server of the first vehicle using a network interface, receiving a set of vehicle data from the onboard server via the network connection, and receiving a set of trip data associated with a communication service provided by the onboard server on the first vehicle during the trip. The method further comprises, in response to receiving an indication of a second user input associated with the vehicle identifier, generating third graphical interface data representing the set of vehicle data, and, in response to receiving an indication of a third user input associated with the trip identifier, generating fourth graphical interface data representing the set of trip data.

In some embodiments, the set of vehicle data comprises unit status data for one or more devices associated with the communication service onboard the first vehicle. The one or more devices may comprise one or more of a wireless access point, an antenna power supply, an antenna, a modem, a transceiver, and a server. In some embodiments, a visual feature of the first vehicle icon is based on the unit status data. In certain embodiments, the method further comprises aggregating the unit status data for the one or more devices, wherein the second graphical interface data represents a vehicle health icon and a visual feature of the vehicle health icon is based on the aggregated unit status data.

In some embodiments, the set of trip data comprises travel route data for the first vehicle. For example, the travel route data may comprise one or more service metrics of the communication service provided on the first vehicle during the trip.

In some embodiments, the set of vehicle data comprises performance data for the communication service provided on the first vehicle during one or more previous trips of the first vehicle. In some embodiments, at least one visual feature of the first vehicle icon may indicate a status level of the performance data. For example, the status level may be based on one or more of a data rate, a signal quality value, a latency, and a packet loss rate of the network communication service.

In some implementations, the present disclosure relates to a system for monitoring a network communication service. The system comprises a plurality of onboard servers, and each onboard server of the plurality of onboard servers is disposed onboard a vehicle of a plurality of vehicles. The system further comprises a subsystem comprising a display device and an on-ground server. The on-ground server is configured to establish a network connection with each onboard server of the plurality of onboard servers, obtain location data indicating respective geographic locations of the plurality of vehicles within a geographic area, and generate, for display on the display device, first graphical interface data. The first graphical interface data represents a map of the geographic area and a plurality of vehicle icons. Each of the plurality of vehicle icons is at a position on the map corresponding to a respective geographic location of one of the plurality of vehicles. The on-ground server is further configured to, in response to receiving a first user input associated with a first vehicle icon of the plurality of vehicle icons, generate, for display on the display device, second graphical interface data. The second graphical interface data represents a vehicle identifier identifying a first vehicle of the plurality of vehicles associated with the first vehicle icon and a trip identifier for a trip associated with the first vehicle. The on-ground server is further configured to receive a set of vehicle data from a first onboard server onboard the first vehicle via the network connection, receive a set of trip data associated with a communication service provided by the first onboard server during the trip, in response to receiving an indication of a second user input associated with the vehicle identifier, generate, for display on the display device, third graphical interface data representing the set of vehicle data, and, in response to receiving an indication of a third user input associated with the trip identifier, generate, for display on the display device, fourth graphical interface data representing the set of trip data.

In some embodiments, the display device is remotely located from the on-ground server. The the set of vehicle data may comprise unit status data for one or more hardware devices configured to be used to provide the communication service onboard the first vehicle.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5 illustrates a graphical interface representing a set of vehicle data in accordance with one or more embodiments.

DETAILED DESCRIPTION

Figure 1:
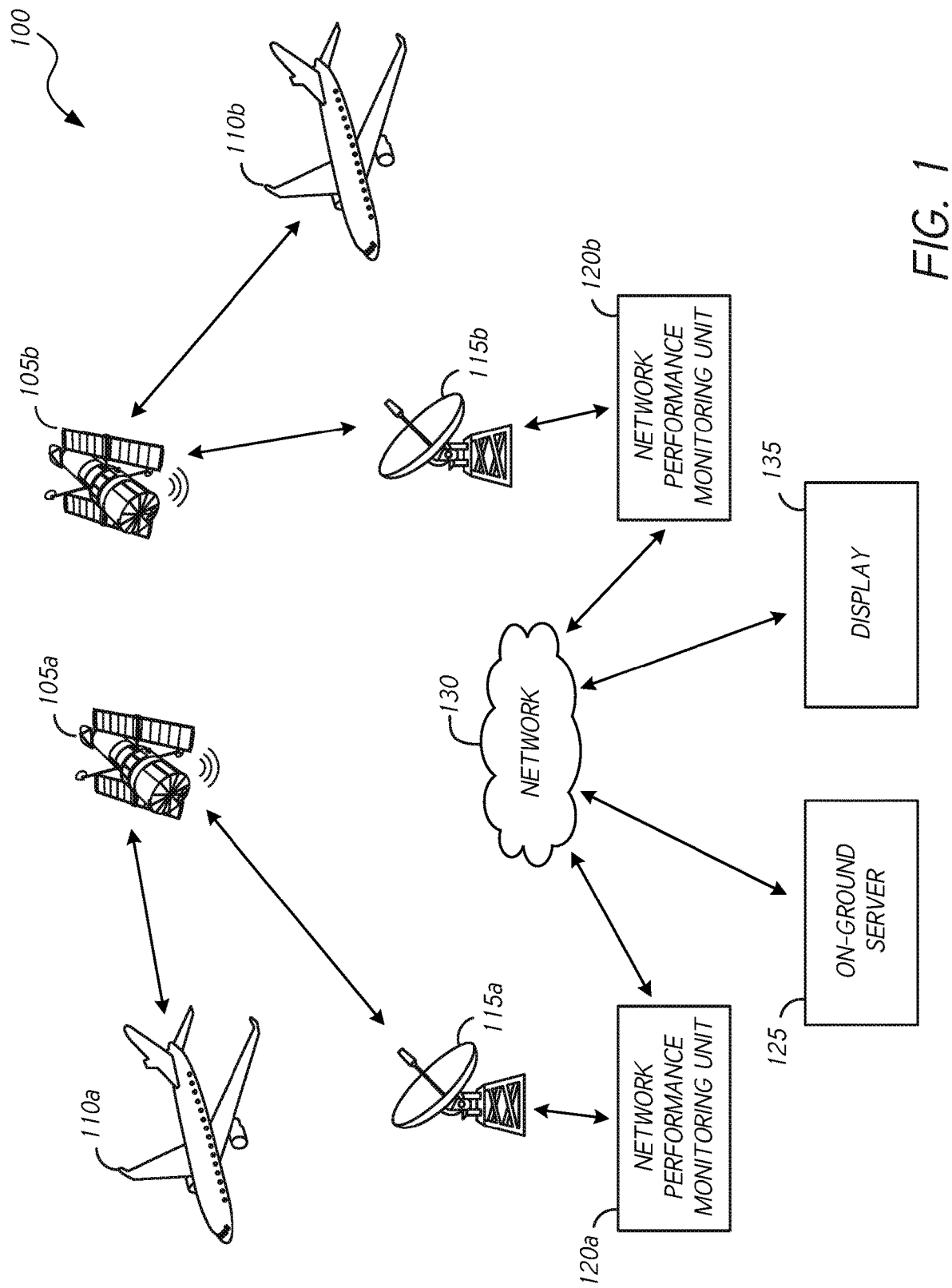
FIG. 1 is a diagram of a network communications system in accordance with one or more embodiments.

The headings provided herein are for convenience only and do not necessarily affect the scope or meaning of the claimed invention. In certain implementations, the present disclosure relates to systems, devices and methods for monitoring network communication systems and services onboard vehicles.

Overview

Aircrafts and other vehicles may be equipped with onboard systems configured to provide communication services, such as wireless network services, to clients onboard the vehicle. The user experience with respect to consumption of media or other content using such communication services on a trip of the vehicle can be affected by the performance of the communication service, which may be related to, or based on, various service performance metrics. The term "trip," as used herein may refer to a travel segment and/or a period of time or space of travel between a beginning and ending of a travel segment of a vehicle and may include any flight, voyage, cruise, or excursion taken by or otherwise associated with a vehicle, such as an aircraft. Embodiments disclosed herein relate to the obtaining, maintenance, and/or provision of vehicle data and trip data related to hardware status and/or service performance associated with a communication service provided on a vehicle during one or more trips.

In some implementations, embodiments of the present disclosure provide for the generation, provision, and/or presentation of graphical interface data representing certain location data, trip data, and/or vehicle data, as well as one or more icons or links associated therewith. The terms "graphical interface data" and "interface data," as used herein, may refer to any data in a computer system that is related to the representation of one or more graphical user interfaces or portions thereof, and may include data and/or code providing instructions for generation and/or display/presentation of various graphical icons and other visual identifiers and/or features in a display device. That is, graphical interface data may represent various graphical icons and/or other visual identifiers or feature. Furthermore, graphical interface data may refer to any type of user interface pages or portions of pages having any type of content. For example, graphical interface data may refer to a page of a website, a page of a network-enabled application, or the like, or to any type of code used by a user interface to generate some or all of a webpage, content page, or interface. Graphical interface data may comprise code conforming to any suitable or desirable language, such as hypertext markup language (HTML) code, Java or Javascript code, Android code, iOS code, other embedded device operating system code, or the like. In some embodiments, interface data is generated, provided, and/or presented representing a map of a geographic area, wherein the map is configured to serve as a menu for selection by a user to allow access to various vehicle data and/or trip data. Aircrafts or other vehicles may be represented on the map by icons or other visual identifiers at locations on the map corresponding to their respective physical locations. User input, such as a click, tap, hover, or the like, associated with an icon representing a vehicle may trigger, or result in, the generation, provision, and/or presentation of graphical interface data related to a communication service provided on the vehicle and/or associated hardware device(s) with respect to one or more trips of the vehicle. Certain visual features of a vehicle icon may indicate a status level of hardware device(s) and/or communication service provided on the vehicle, and therefore a user may be prompted to execute user input associated with a vehicle icon, or may otherwise be notified of communication service status, based on the visual feature(s) of the vehicle icon. By allowing for user input and interaction associated with vehicle icons on a map, a user may be able to link to vehicle data and/or trip data for vehicles in a particular geographic area through interaction or engagement with vehicle icons represented on the map in the geographic area.

Vehicle data associated with a communication service provided on a vehicle may include any type of communication-service-related information associated with the vehicle. For example, among other possibilities, vehicle data may indicate a number of service cases opened within a certain period of time as a data point relating to a vehicle. Vehicle data may further provide information about communication service hardware replacement or maintenance. Such information may provide insight as to whether equipment replacement has contributed to communication service performance on a vehicle. Trip data associated with a communication service provided during a trip may include any type of communication-service-related information associated with the trip. For example, vehicle passenger experience reporting events may be captured in trip data that may be presented in connection with interface data generated in accordance with embodiments of the present disclosure. In some embodiments, visual feature(s) of a vehicle icon provide an indication of an aggregation of multiple hardware and/or service performance status levels. Such aggregated status level indicating visual features may, for example, indicate whether an overall health of a communication service system of the vehicle is good, fair, poor, or other categorization.

Communications System

In some implementations, the present disclosure provides systems, methods, and devices that provide for monitoring of communication services and systems onboard a vehicle. FIG. 1 illustrates a communications system 100, which provides a context for various embodiments disclosed herein. Many other configurations are possible having more or fewer components than the communications system 100 of FIG. 1.

In the illustrated embodiment, the communications system 100 includes a plurality of vehicles 110a-b, shown as airplanes in FIG. 1 for convenience, which are in communication with a terrestrial network 130 via one or more satellites 105a-b and one or more network gateways 115a-b. Although FIG. 1 illustrates airplanes, it should be understood that the each of the vehicles 110a-b may be any type of vehicle, as described in greater detail below. Each of the vehicles 110a-b may include a two-way communication system to facilitate bidirectional communication with one of the one or more satellites 105a-b (or other type of access network, such as an air-to-ground network). In some embodiments, each of the vehicles 110a-b may be associated with one or more network service areas based on a present location of the vehicles 110a-b. For example, in some embodiments, if a vehicle 110a-b is within a geographic area associated with a first network service area of the one or more network service areas, then the vehicle 110a-b may be associated with the first network service area. Alternatively, a vehicle 110a-b may be associated with one or more network service areas based on an origin or destination of the vehicle 110a-b, with respect to a trip of the vehicle.

The vehicles 110a-b may be in communication with an on-ground server 125 via the network 130. In some embodiments, a respective network performance monitoring unit 120a-b may be positioned in a communication path between the vehicles 110a-b and the network 130, so as to monitor forward and/or return link performance of service provided to the vehicles 110a-b.

Each of the vehicles 110a-b may be any type of vehicle, such as an airplane, a train, a bus, a cruise ship, an automobile, etc. As illustrated, the network 130 can be any type of network and can include, for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 130 can include both wired and wireless connections, as well as optical links.

While two vehicles 110a-b are shown in communication with the network 130 via two satellites 105a-b, techniques described herein can be applied in many other communications environments without departing from the scope of the inventions. Any or all such vehicle(s) 110a-b can communicate via any of one or more suitable communications architecture(s), including any suitable communications links or access networks, such as satellite communications systems, air-to-ground communication systems, hybrid satellite and air-to-ground communications systems, cellular communications systems, etc. Typically, because of the mobile nature of the vehicles 110a-b, the communications architecture will likely involve at least one wireless communications link.

The on-ground server 125 may include one or more electronic hardware computers or components, including control circuitry configured to perform certain functionalities, as discussed in greater detail below. The vehicles 110a-b may be configured to transmit vehicle-specific communication service performance data indicating one or more characteristics of communication service performance (e.g., network communication service) experienced onboard the vehicle while the associated onboard server is serviced by a particular network service area. The vehicle-specific communication service performance data may be transmitted or transferred from the vehicles 110a-b to the one or more satellites 105a-b, and further to one of the one or more gateways 115a-b, to the network 130, and to the on-ground server 125.

In some embodiments, the vehicles 110a-b may include position determination device(s), such as an inertial measurement unit (IMU) or global positioning system (GPS). Such devices, if installed, may allow the vehicle to determine its physical location, wherein such location information may be utilized by the on-ground server 125 in performing certain functionality disclosed herein. Alternatively, other techniques for determining a vehicle's location may be used. For example, in embodiments in which the satellite 105a-b is a spot beam satellite, a vehicle 110a-b may be able to derive its location based on the spot beam being used to communicate with the satellite network 160. In some embodiments, the vehicle 110a-b may transmit its position information to the on-ground server 125. The position information may be associated with vehicle-specific metrics that are collected near or at the reported position. This may allow the on-ground server 125 to correlate particular vehicle-specific metrics with specific network service areas based on the associated position. In some embodiments, location data for one or more of the vehicles 110a-b is obtained by the on-ground server 125 from a separate entity or server not shown in the diagram of FIG. 1, wherein such entity or server may receive location data from the vehicle(s) or otherwise derive the location data in some manner.

The on-ground server 125 may generate and/or provide graphical interface data for presentation on a display 135, for example at a monitoring station. In some embodiments, the display 135 may be a component of the on-ground server 125, while in other embodiments, the display 135 may connect to the on-ground server 125 via the network 130. The on-ground server 125 may provide user interface data for presentation on the display 135 similar to the example embodiments shown in FIGS. 4, 5A-B, 6A-G, and/or 7, discussed in detail below.

In some embodiments, one or more of the satellites 105a-b, gateways 115a-b, or other ground-based network equipment (not shown in FIG. 1) may be configured as the network performance monitoring units 120a-b, and thus may generate return link and/or forward link vehicle-specific performance data. For example, in some embodiments, the network performance monitoring units 120a-b may be routers or other types of network equipment, and may be positioned at one end of a communication link providing network communication to a vehicle 110a-b. A router may be configured to determine vehicle-specific communication service performance data by filtering data transmitted over the communication link to include only data destined for or received from a particular vehicle. The router may determine return link and/or forward link vehicle-specific communication service performance data, such as return link and/or forward link latency, throughput, dropped packet count or percentage, retransmission count or percentage, jitter, or other indicators of vehicle-specific return link and/or forward link communication service performance. In these aspects, the satellites 105a-b, gateways 115a-b, or other ground-based network equipment may be configured to send the vehicle-specific performance data to the on-ground server 125.

On-Ground Server

Figure 2:
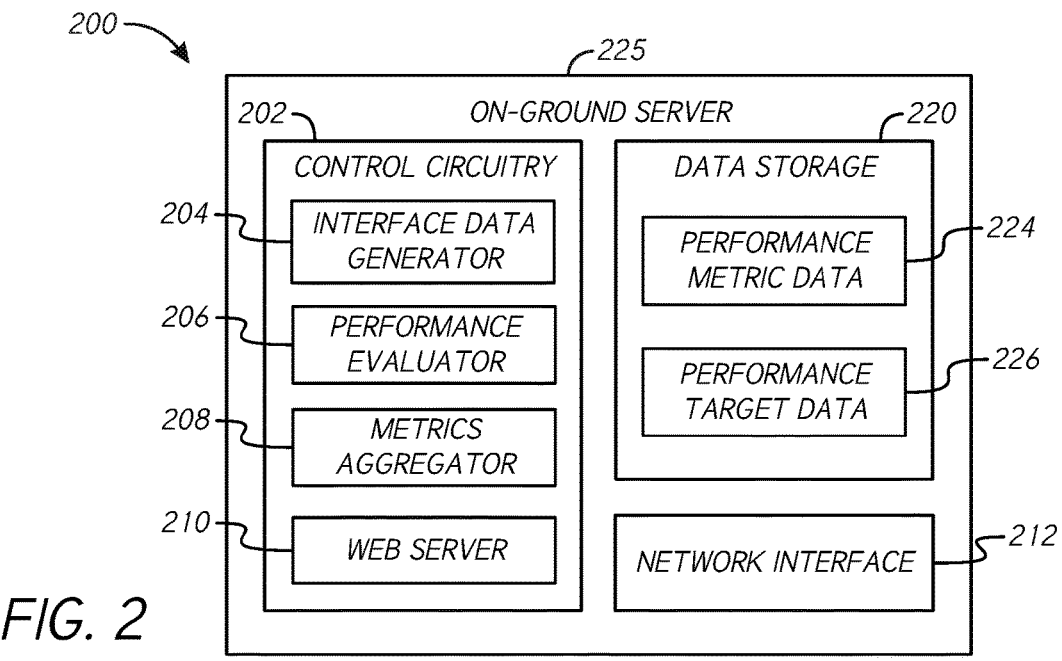
FIG. 2 is a block diagram illustrating an on-ground server in accordance with one or more embodiments.

FIG. 2 is a block diagram illustrating an on-ground server 225 in accordance with one or more embodiments. The on-ground server 225 represents an example embodiment of the on-ground server 125 shown in FIG. 1 and described above. Many other configurations of the on-ground server 225 are possible having more or fewer components than those illustrated in FIG. 2. In some embodiments, the on-ground server 225 may be comprised of multiple physical computers, which may be geographically distributed across a wide area and connected via a network. In some embodiments, the on-ground server 225 comprises a single hardware computer contained within a single physical enclosure. In some embodiments, the on-ground server 225 is comprised of multiple physical enclosures, some of which are within a single physical enclosure and some of which are geographically distributed away from the single physical enclosure. Additionally, the functionalities described with respect to the on-ground server 225 can be distributed among the components of the system 100 of FIG. 1 in a different manner than shown or described herein.

With reference to FIG. 1, in some embodiments, communication service performance data for one or more vehicles 110a-b may be received by a satellite 105a-b for example, and then received by the on-ground server 125. The illustrated components and features of the on-ground server 225, which represents an embodiment of the on-ground server 125 of FIG. 1, include control circuitry 202 and a network interface 212. The control circuitry 202 may be in communication with the network interface 212 via one or more electronic buses, or other connectivity features (not shown), of the on-ground server. The control circuitry 202 may communicate with the network interface 212 to transmit and/or receive packets over a network, such as a network providing connectivity to one or more vehicles, such as the vehicles 110a-b discussed above with respect to FIG. 1.

The control circuitry 202 may comprise one or more processors, volatile and/or non-volatile data storage devices, registers, amplifiers, filters, radio-frequency and/or baseband signal processing components, transceivers, device controllers, communication interfaces, and/or the like configured to perform certain functionality disclosed herein. The control circuitry 202 includes graphical interface data generator circuitry 204, performance evaluator circuitry 206, metrics aggregator circuitry 208, and web server circuitry 210. The functionality of each of the illustrated functional components of the control circuitry 202 can be embodied in code stored or maintained in one or more volatile or nonvolatile data storage devices, which may be part of a virtual or physical memory space accessible to the control circuitry 202. For example, the interface data generator 204, performance evaluator 206, metrics aggregator 208, and/or web server 210 may include code (e.g., binary data) defining instructions that configure the control circuitry 202 to perform the respective functions.

In some embodiments, the metrics aggregator 208 may include instructions that configure the control circuitry 202 to collect one or more performance metrics for a communication service provided to a monitored vehicle, such as an aircraft, and store the performance metric data 224 in the data storage 220. The metrics aggregator 208 may aggregate performance metrics for the communication service. For example, in some embodiments, the metrics aggregator 208 may generate an average, maximum, minimum, mean, and/or median of two or more communication service performance metrics for a communication service provided on a vehicle for at least one trip of the vehicle. The metrics aggregator 208 may determine negative variances between communication service performance metrics of a vehicle being monitored as it proceeds along its travel route. Such negative variances may themselves be aggregated to produce summary metrics (for example, one metric) representing a difference in performance of a communication service of the monitored vehicle compared to certain performance targets 226, which may provide threshold values/metrics for evaluating communication service performance. In some embodiments, aggregation of negative variances may be divided by the duration of the given trip to the present point to provide an average negative variance experienced during the trip.

The performance evaluator 206 may compare aggregated communication service performance metrics to performance target data 226, which may include target threshold values for certain performance metrics. For example, performance target data 226 may be stored in the data storage 220, and may be accessed by the performance evaluator 206 or other component. The performance target data 226 may include values associated with Service Level Agreements (SLAs) and/or other target performance measures of the communication service, and may represent a variety of measurement types. In one embodiment, a performance target 226 may represent a target data rate, or a percentage of time the target data rate has been achieved. The metrics aggregator 208 may gather data rate statistics over a period of, for example, an entire trip of a vehicle. The performance evaluator 206 may collect the gathered data rate statistics and may compare them to data rate target values of the performance target data 226. Based on the comparison, the performance evaluator 206 may generate a data rate status level.

In some embodiments, communication service performance status levels associated with one or more communication service performance metrics may implement a multi-tiered threshold scheme, such as a two-tiered threshold scheme. For example, the performance target data 226 may include a first threshold indicating that a first data rate should be achieved for at least a first percentage of a given trip, and a second (e.g., lower) data rate should be achieved for at least a second (e.g., lower) percentage of the trip. If both the first data rate and second data rate targets are met, the performance evaluator 206 may indicate a positive (e.g., "normal") data rate status level, whereas if either or both of the first data rate and the second data rate targets are not met, the performance evaluator 206 may indicate a negative (e.g., "impaired") status level. The interface data generator 204 may receive communication service performance status and/or value data from the performance evaluator 206 and generate interface data including icons and/or values with corresponding visual features based on the determined status levels. For example, in some embodiments, in response to a positive status level indication, the interface data generator 204 may generate graphical interface data representing a green icon, and in response to a negative status level indication, the interface data generator 204 may generate graphical interface data representing a yellow or red icon.

The web server 210 may include instructions that configure the control circuitry 202 to provide a web-based user interface. The web-based user interface may provide the ability for a user to provide user input for the configuring of one or more of the threshold values or other performance target data discussed herein. Additionally, the web-based user interface may provide graphical interface data representing values for the metrics collected by the systems/components described herein. The web server 210 may further be configured to generate and/or provide graphical interface data generated by the interface generator 204 to one or more remote or local monitoring systems for display and/or presentation to a user. The web server 210 may receive indications of user input in connection with a graphical interface, wherein generation of graphical interface data by the interface data generator 204 may be triggered by such user input indications, as described in detail below.

With reference to FIGS. 1 and 2, in certain embodiments, the web server 210 may provide web page data to the one or more vehicles 110a-b, and the metrics aggregator 208 may collect metrics indicating quality of experience (e.g., how quickly the web pages load) at the one or more vehicles 110a-b. For example, the aggregated metrics may indicate a number of seconds required, at the one or more vehicles 110a-b, to load the web page data provided by the web server 210. The performance evaluator 206 may compare the aggregated metrics to performance target data 226 (e.g., a target maximum number of seconds) and provide corresponding status data to the interface generator 204.

Web page and/or website content may be copied to, and/or served at, the web server 210. In this way, communication service performance metrics may be representative of performance of the communication network communicatively connecting the on-ground server 225 and the monitored vehicle, and may not be affected by performance issues that may affect transfer of content from the origin server (e.g., the server that created the website). The web server 210 may be a single server or may represent a distributed network of servers across a geographic area. The metrics aggregator 208 may collect metrics representative of a variety of content types, including flash pages, static content, and dynamically loaded content.

Vehicle Onboard Communication Service System

Figure 3:
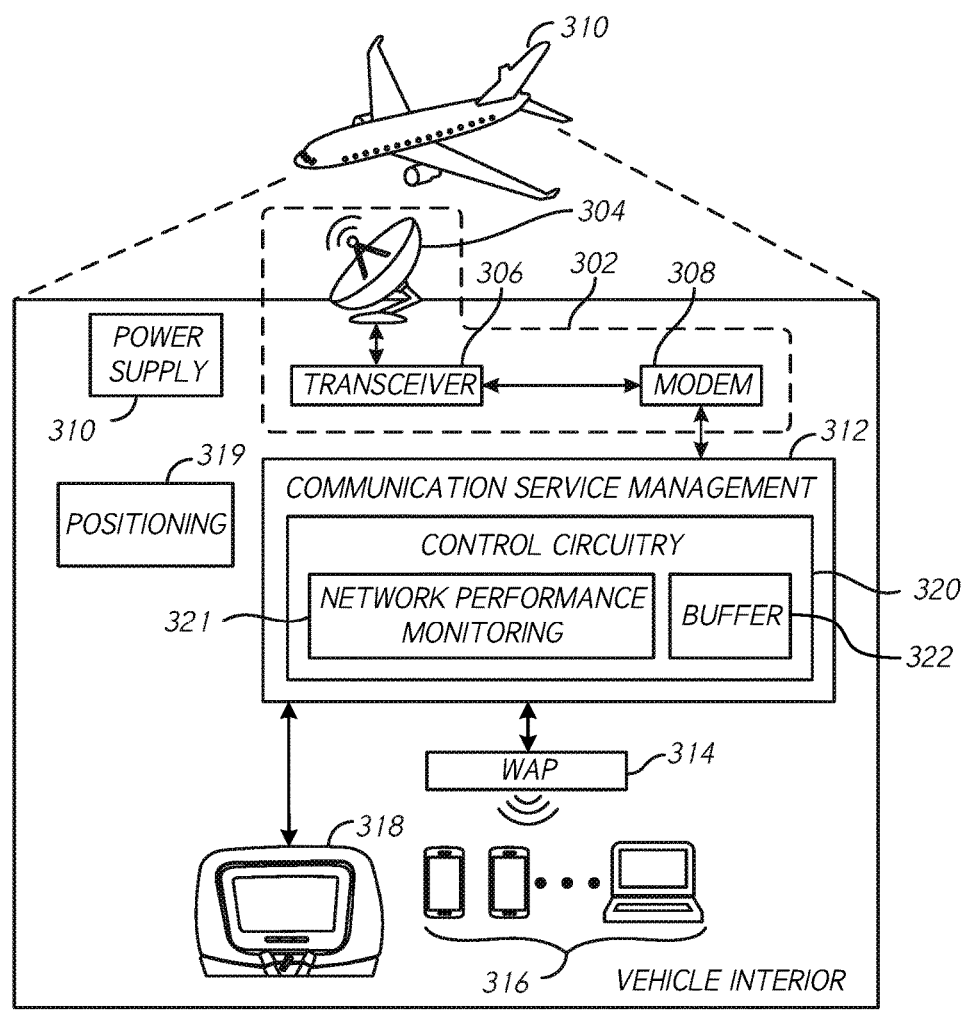
FIG. 3 is a diagram illustrating a vehicle interior in accordance with one or more embodiments.

FIG. 3 is a diagram illustrating a vehicle 310 in accordance with one or more embodiments. The vehicle 310 represents an example embodiment of one of the vehicles 110a-b shown in FIG. 1 and described above. The vehicle 310 may include various hardware devices, including one or more antennas 304, a transceiver 306, a modem 308, a power supply 310, communication service management system 312, one or more wireless access points (WAPs) 314, as well as one or more onboard media clients, which may comprise personal electronic devices (PEDs) 316 and/or passenger seat-back media systems 318. The antenna 304, transceiver 306, and modem 308 may comprise a two-way communication system 302 that may be configured to facilitate bidirectional communication with a satellite (e.g., one of satellites 105a-b in FIG. 1).

The two-way communication system 302 can provide for reception of a forward downlink signal from a satellite and transmission of a return uplink signal to the satellite to support two-way data communications between media clients within the vehicle 310 and a terrestrial network (e.g., the Internet). The PEDs 316 can include smartphones, laptops, tablets, netbooks, and the like brought onto the vehicle 310 by passengers or crew members. The PEDs 316 and/or seat back systems 318 can communicate with the communication service management system 312 via a communication link that can be wired and/or wireless. The communication link can be, for example, part of a local area network such as a WLAN supported by the one or more WAPs 314. WAPs 314 can be distributed about the vehicle 310, and can provide traffic switching and routing functionality; for example, as part of a WLAN extended service set (ESS), etc.

In operation, the communication service management system 312 installed within the vehicle 310 can provide uplink data received from the PEDs 316 and/or seatback systems 318 to the modem 308 to generate modulated uplink data (e.g., a transmit intermediate frequency (IF) signal) for delivery to the transceiver 306. The transceiver 306 can upconvert and then amplify the modulated uplink data to generate the return uplink signal for transmission to the satellite 105 via the antenna system 304. Similarly, the transceiver 306 can receive the forward downlink signal from a satellite via the antenna(s) 304. The transceiver 306 can amplify and down-convert the forward downlink signal to generate modulated downlink data (e.g., a receive IF signal) for demodulation by the modem 308. The demodulated downlink data from the modem 308 can be provided to the communication service management system 312 for routing to the PEDs 316. The modem 308 can be integrated with a network performance monitoring unit 321 of the communication service management system 312, or can be a separate component in some examples.

The network performance monitoring unit 321 may include, in some embodiments, one or more electronic hardware processors and/or electronic hardware memory devices, and one or more network interfaces. The electronic hardware processor may be configured to perform a variety of functions associated with monitoring the network performance of the communication service with respect to the vehicle 310.

The communication service management system 312 may include, in some embodiments, control circuitry 320 comprising the network performance monitoring unit 321 and a data buffer 322. The control circuitry 320 may be configured to perform a variety of functions associated with monitoring the network performance of the communications service provided on the vehicle 310 by the communication system 302 and the communication service management system 312.

In some embodiments, the communication service management system 312 may be configured to generate performance data associated with the communication service provided on the vehicle 310 by the communication system 302 and the communication service management system 312, and transmit the performance data over an access network. The performance data may be vehicle-specific performance data and/or trip-specific data. One or more metrics included in the performance data representing the measured performance of the communication service provided on the vehicle 310 may be generated by the communication service management systems 312.

In some embodiments, the performance data may indicate one or more metrics, the one or more metrics including one or more of a number or average number of dropped packets, average throughput or delays during a time period, an availability of the communication service during a time period, data rate, signal quality values, latency, packet loss rate, and a maximum number of PEDs 316 connected, with respect to the communication service. In some embodiments, the availability of network service may be represented as a percentage of time that network service was available to the communication service management system 312. In some embodiments, the vehicle-specific performance data may indicate an availability of one or more of uplink and/or downlink communications.

The communication service management system 312 (e.g., specifically, the network performance monitoring unit 321) may be further configured to periodically re-determine one or more of the metrics described above. For example, in some embodiments, a moving average of one or more of the metrics may be determined at a periodic interval. In some embodiments, the communication service management system 312 may be further configured to periodically report one or more of the metrics to an on-ground server (e.g., the on-ground server 125 and/or the on-ground server 225). In some embodiments, the communication service management system 312 may be configured to calculate forward link performance data, while another communication service management system installed off-board the vehicle 310 may be configured to calculate return link performance data.

The communication service management system 312 (e.g., specifically, the network performance monitoring unit 321) may also be configured to monitor a location of the vehicle 310 and to periodically report the location of the vehicle 310 over the access network to the on-ground server. For example, the vehicle 310 may comprise positioning circuitry, such as Global Positioning System (GPS) circuitry, configured to determine a present location or position of the vehicle 310. In some embodiments, the network performance monitoring unit 321 may associate one or more of the communication service performance metrics with one or more vehicle 310 locations, and report the association to the on-ground server.

The vehicle 310 comprises certain hardware devices used to provide the onboard communication service. At least some of the hardware devices used for communication service provision on the vehicle may be self-reporting, for example by providing periodic status updates to the communication service management unit 312. If a status update is not received from a hardware device after a given period of time, the status of the hardware device may be designated as "unknown," or may be defaulted to "impaired." Certain hardware devices may be configured to recognize when it is experiencing an issue, such as not receiving a requisite voltage level. In such cases, the hardware device may generate an "error" status. Status updates collected by the control circuitry 320 may be transmitted via the communication system 302 when requested by the on-ground server or based on other events.

Graphical Interface Vehicle and Trip Data Navigation

Figure 4:
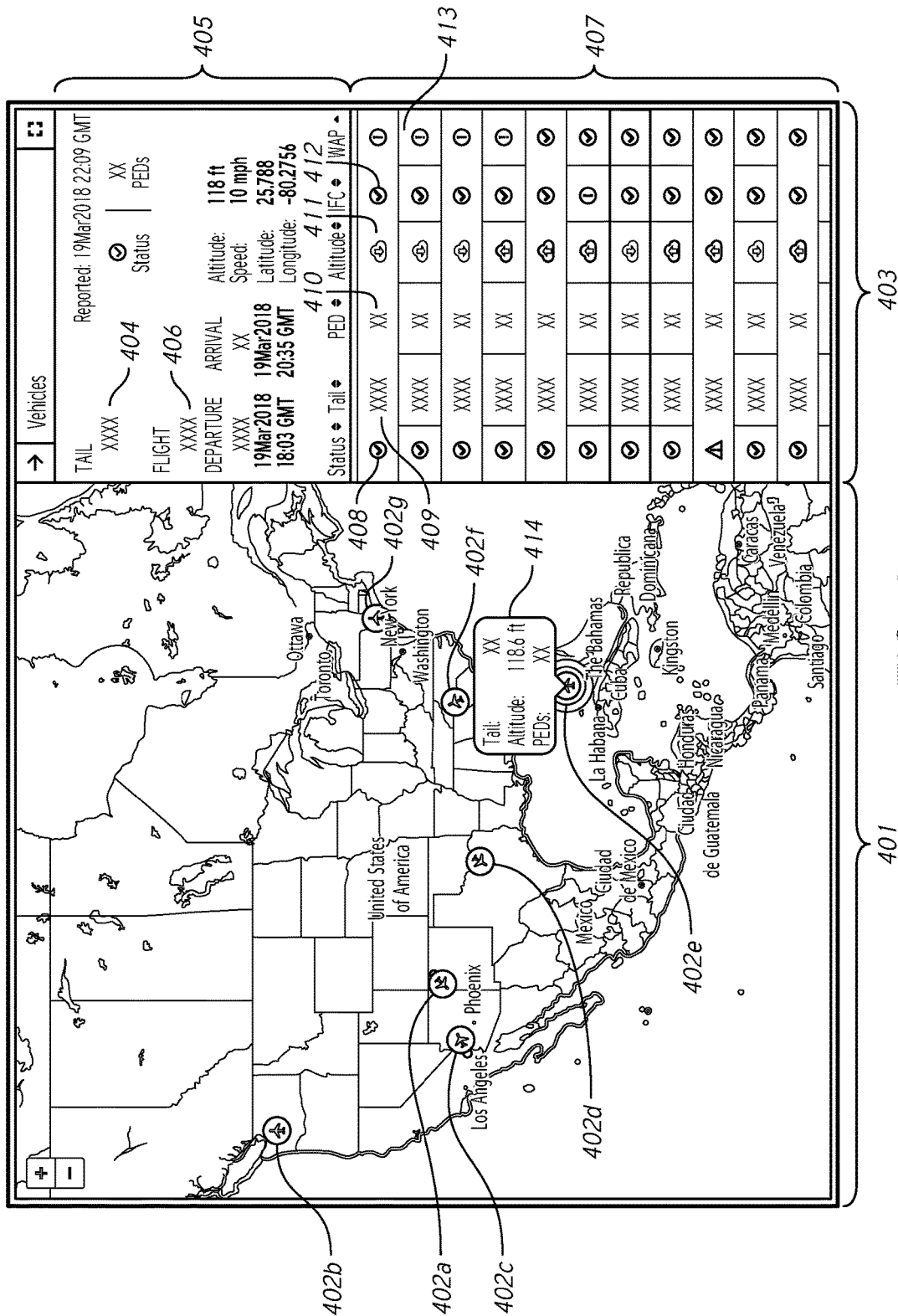
FIG. 4 illustrates a graphical interface representing communication service status data associated with a plurality of vehicles in accordance with one or more embodiments.

FIG. 4 illustrates a graphical interface 400 representing communication service status data associated with a plurality of vehicles in accordance with one or more embodiments. The interface 400 includes a first graphical interface area representing a map 401 of a geographic area, in the illustrated case, a map of the continental United States, and a plurality of vehicle icons 402*a-g* overlaid on the map 401, each of the vehicle icons 402*a-g* being a position on the map corresponding to a respective geographic location of an actual vehicle being monitored. In the illustrated embodiment, the vehicles are aircrafts. Alternatively, other and/or additional types of vehicles (e.g., trains, cruise ships, automobiles) may be represented in the map region 401 or in similar interfaces.

Each of the vehicle icons 402*a-g* may correspond to a vehicle in travel. Accordingly, a location of each vehicle, and associated vehicle icon, may change over time. Each of the vehicle icons 402*a-g* may be at a position on the map 401 that corresponds to a current or most recent known location of one of a plurality of vehicles being monitored. The location of a vehicle may be determined based on location data received from the vehicle, such as from an onboard server of the vehicle via a network connection, or from a different source (e.g., a vehicle monitoring server). For example, the vehicle may provide longitudinal and latitudinal coordinates which indicate the vehicle's position on the map 401. Alternatively, location data indicating geographic locations of one or more vehicles within the relevant geographic area may be obtained through another source or means (e.g., from a vehicle monitoring server). According to one use case, a first aircraft may be presently traveling over or near the city of Phoenix. The first aircraft may transmit location data indicating the first aircraft's location. Accordingly, a first vehicle icon 402*c* may be situated on the map 401 at a position that corresponds to the location data received from the first aircraft, namely over or near the city of Phoenix on the map. Positions of vehicle icons 402*a-g* may be updated when new location data is received. The map 401 may have a zoom feature to allow for zooming in and out with respect to selected portions of the map.

In some embodiments, the vehicle icons 402*a-g* may include an image or other visual feature that corresponds to the type of vehicle. For example, because the vehicles represented in FIG. 4 are aircrafts, each of the vehicles icons 402*a-g* in the illustrated embodiment includes an image of an aircraft. A visual feature of a vehicle icon 402*a-g* may be indicative of a direction of the vehicle. In some embodiments, the direction of a vehicle may be determined based on location data received from the vehicle. For example, comparison of a present or most recent known location status to a previous location status of the vehicle may be used to determine the direction of travel of the vehicle. An image corresponding to the type of vehicle may be oriented in the vehicle icons 402*a-g* based on the direction of travel.

Each of the vehicle icons 402*a-g* may have any of a variety of visual features. In some embodiments, a vehicle icon 402*a-g* may be represented in a certain color to indicate a status of the vehicle, such as a status of the vehicle with respect to communication service performance provided onboard the vehicle over a period of time or for one or more trips. In some embodiments, if performance of a communication service associated with a vehicle (e.g., WiFi network service provided onboard the vehicle) is impaired in some way (e.g., there are no PEDs currently using the network communication service), the vehicle icon may be red, or may have one or more other visual features indicating an impaired state. In certain embodiments, the color of the vehicle icon may indicate whether the vehicle is out of a coverage area. For example, vehicle icons corresponding to vehicles within a coverage area may be green, while vehicle icons corresponding to vehicles outside the coverage area may be red, according to some embodiments.

In some embodiments, the map 401 may be customized to control which vehicle icons 402*a-g* are included in the map 401. For example, in one use case, a user accessing the interface 400 may be an employee of an airline. The user may customize the interface 400, or the interface may be customized automatically in view of login credentials of the user, such that only vehicle icons 402*a-g* corresponding to aircrafts associated with the airline are included in the interface 400. The vehicle icons 402*a-g* may be filtered in a variety of other ways as well. For example, only vehicle icons 402*a-g* corresponding to vehicles with a number of PEDs above a given threshold value may be included. In another example, only vehicle icons 402*a-g* corresponding to vehicles with a departure time within a given time range may be included.

The interface 400 may further include one or more data tables in a second graphical interface portion 403. In some embodiments, the second graphical interface portion 403 may be generated and/or presented in response to receipt of an indication of user input associated with a vehicle icon of the first graphical interface portion 401. For example, an on-ground server may generate graphical interface data representing the second graphical interface portion 403 and provide the graphical interface data for display in response to receipt of the user input indication. The user input indication may be associated with a click, hover, tap, or other user input action executed by a user with respect to the interface portion 401. The second graphical interface portion 403 may include a first area 405 representing a vehicle identifier 404, such as a tail ID for aircraft embodiments, and/or a trip identifier 406, such as a flight number for aircraft embodiments. The first area 405 may further represent additional data and/or status indications relating to one or more vehicles. For example, the data in the first area 405 may be related to a vehicle (e.g., a first vehicle) associated with the user input indication that triggered the generation and/or provision of the second graphical interface portion 403 (e.g., clicking a vehicle icon 402*a-g* associated with the first vehicle).

The second graphical interface portion 403 may further include a second area 407 comprising one or more data tables, which may be generated and/or presented together with the first area 405, or independently from the first area 405. That is, in certain embodiments, only the first area 405 is present, while in other embodiments, only the second area 407 is present. In certain embodiments, the second graphical interface portion 403 may include only the second area 407 by default. In such embodiments, the second area 407 may be sized to cover all or almost all of the second graphical interface portion 403 when the first area 405 is not present. In response to an indication of a user input, the first area 405 may be added to the second graphical interface portion 403 and the second area 407 may be reduced in size to accommodate the first area 405.

In the illustrated interface 400, as well as other interfaces disclosed herewith, the character 'X' is used to represent an arbitrary or generic character value, and may be representative of any number of characters or values. Furthermore, a string of multiple characters 'XX . . . ' may be representative of any string of one or more characters or values, such as alphanumeric characters.

A data table of the second area 407 may include various data corresponding to each of one or more of the vehicle icons 402*a-g* on the map 401. For example, each line item or entry of the data table may include one or more of the following parameters or values: a general status icon 408, a vehicle identifier 409, a number of PEDs 410 present on the vehicle and/or consuming communication service thereon, altitude or other positional information 411 (e.g., indicating an increase or decrease in altitude, speed, or the like), a communication service status icon 412, and hardware device status icon 413. The vehicle identifiers 409 may be any identifying labels assigned to vehicles. For example, in the case of an aircraft, a vehicle identifier 409 may be a federal aviation administration (FAA) number. The PED data 410 may indicate the number of PEDs onboard and/or connected to a network communication service of the vehicle. Each of the status icons 408, 412, 413 may have one or more of a variety of visual features. Visual features may include, for example, a color (e.g., a green color indicating a "normal" status, yellow color indicating an "impaired" status, red color indicating an "error" status, or the like), a shape (e.g., a circle indicating a "normal" status, a triangle indicating an "impaired" status, or the like), and/or a symbol (e.g., a checkmark indicated a "normal" status, exclamation point indicating an "impaired" or "error" status, or the like). The general vehicle status icon 408 may be an indication of aggregated performance data and/or hardware device data for the vehicle. For example, if both the communication service icon 412 and hardware device icon 413 indicate a "normal" status, the general vehicle status icon 408 may also indicate a "normal" status, whereas if either the communication service icon 412 or the hardware device icons 413 indicate an "impaired" status, the general vehicle status icon 408 may also indicate an "impaired" status. Alternatively, the general vehicle status icon 408 may indicate an "impaired" status only if both the communication service icon 412 and the hardware device icon 413 indicate an "impaired" status. "Error" status for the general vehicle status icon 408 may likewise be based on a corresponding "error" and/or "impaired" status of one or both of the communication service icon 412 and the hardware device icon 413.

Each of the vehicle icons 402*a-g* may be selectable via user input. In certain embodiments, a hover event (or a click, tap, or other user input event) at a first vehicle icon 402*e* may cause generation of a pop-up box 414 at or near the first vehicle icon 402e. The pop-up box 414 may include any of a variety of data associated with a first vehicle corresponding to the first vehicle icon 402e. For example, the pop-up box 414 may include a vehicle identifier, altitude measurement, and a number of PEDs present on the vehicle and/or consuming communication service thereon.

As referenced above, in some embodiments, a click event (or a hover, tap, or other user input event) at a vehicle icon 402a-g may cause generation of the first area 405 of the second graphical interface portion 403. Although described above as being part of a graphical interface portion that also includes the second area 407, in some embodiments, the first area 405 is separate from the second area 407 and/or second graphical interface portion 403. The first area 405 may include a data table, or other data representation, representing vehicle health information. The vehicle health information may include a variety of data associated with the vehicle, for example a vehicle identifier 404, a trip identifier 406, departure information (e.g., location, time, date), arrival information (e.g., location, time, date), a general vehicle status icon, a number of PEDs onboard and/or connected to a network communication service of the vehicle, altitude, speed, latitude, and/or longitude. Each of the vehicle identifier 404 and the trip identifier 406 may have associated hyperlinks. In some embodiments, as described in detail below, a hyperlink associated with the vehicle identifier 404 may be configured to generate graphical interface data representing a vehicle health page. In some embodiments, as described in detail below, a hyperlink associated with the trip identifier 406 may be configured to generate graphical interface data representing a trip data page. Therefore, the map graphical interface 401 may advantageously provide an efficient and simple view of vehicle locations, as well as additional information of the vehicles. By accessing the map graphical interface 401, users may be able to quickly identify vehicles which may be experiencing issues. Moreover, the map 401 may include various interactive features to allow users to quickly access additional information relating to communication system and/or hardware status of vehicles of interest with respect to one or more trips of the vehicle.

Vehicle Data Graphical Interface

FIG. 5 illustrates a graphical interface 500 representing a set of vehicle data in accordance with one or more embodiments. In some embodiments, the graphical interface 500 and/or associated interface data may be generated in response to user input associated with a vehicle identifier, such as user input associated with the vehicle identifier 404 of the interface 400 shown in FIG. 4 and described above, or similar interface. The vehicle data interface 500 may include a vehicle health table 502, which may comprise the vehicle identifier 504, data related to open cases 506, data related to equipment swaps 508, and/or data related to passenger contacts 510.

Cases 506 may be any reports generated by passengers and/or personnel associated with a vehicle. A case 506 may represent a reported problem associated with the vehicle, for example. The number of cases 506 opened for the vehicle may be included in the health table 502, while a list of cases reported within a given period of time may be included in a cases table 522. Each listed case may have an identification number, a type, a category, and a subject. The case table 522 may further include progress information for each case, for example a priority level, a status, a date/time created, and a most recent status date/time.

The vehicle data interface 500 may further include a hardware device table 512, which may comprise a variety of data related to individual hardware devices of the vehicle. For example, the listed hardware devices may be associated with the communication service provided onboard the vehicle. Each device may be provided in connection with a data entry comprising one or more of the associated device name, identification number, status, hardware information (which may include a part number and/or revision number), software information (which may include a revision number), and firmware (which may include a revision number).

Information included in the vehicle data interface 500 may be useful in diagnosing issues with a vehicle. For example, a large number of cases opened for a vehicle may indicate a possible issue, and certain responsive measures may be taken. For example, equipment within the vehicle may be replaced based on vehicle data presented in the vehicle data interface 500. Using equipment status information on the vehicle device table 512 may indicate whether replacing of equipment has corrected a known issue. With reference back to the graphical interface 400 of FIG. 4 described above, if a vehicle icon on the map graphical interface 401 indicates a possible issue with the associated vehicle (e.g. there are no PEDs connected), a user may select the vehicle icon 402a-g and/or the vehicle identifier 404 to view the vehicle data interface 500 to better diagnose the issue.

Equipment statuses may be aggregated to generate an overall hardware device status of the vehicle. For example, if each device has a "normal" status, an overall status of the vehicle may be "normal." Accordingly, a vehicle icon on the map graphical interface 401 of FIG. 4 associated with the vehicle may be indicative of the "normal" status (e.g. the vehicle icon may comprise a green color and/or checkmark symbol). If any, or a certain number, of the equipment statuses has an "impaired" status, the overall status of the vehicle may be "impaired." Similarly, if any, or a certain number, of the statuses are listed as "unknown" or "error," the status of the vehicle may be "unknown" or "error," respectively.

In some embodiments, the vehicle data interface 500 may further include performance data associated with a communication service provided on a vehicle during one or more previous trips of the vehicle. The performance data may be vehicle-specific performance data and/or trip-specific data.

In some embodiments, the performance data may indicate one or more metrics, the one or more metrics including one or more of a number or average number of dropped packets, average throughput or delays during a time period, an availability of the communication service during a time period, data rate, signal quality values, latency, packet loss rate, and a maximum number of PEDs connected, with respect to the communication service during one or more previous trips of the vehicle. In some embodiments, the availability of network service may be represented as a percentage of time that network service was available to the communication service management system during the one or more previous trips of the vehicle. In some embodiments, the vehicle-specific performance data may indicate an availability of one or more of uplink and/or downlink communications.

Trip Data Graphical Interface

Figure 6A:
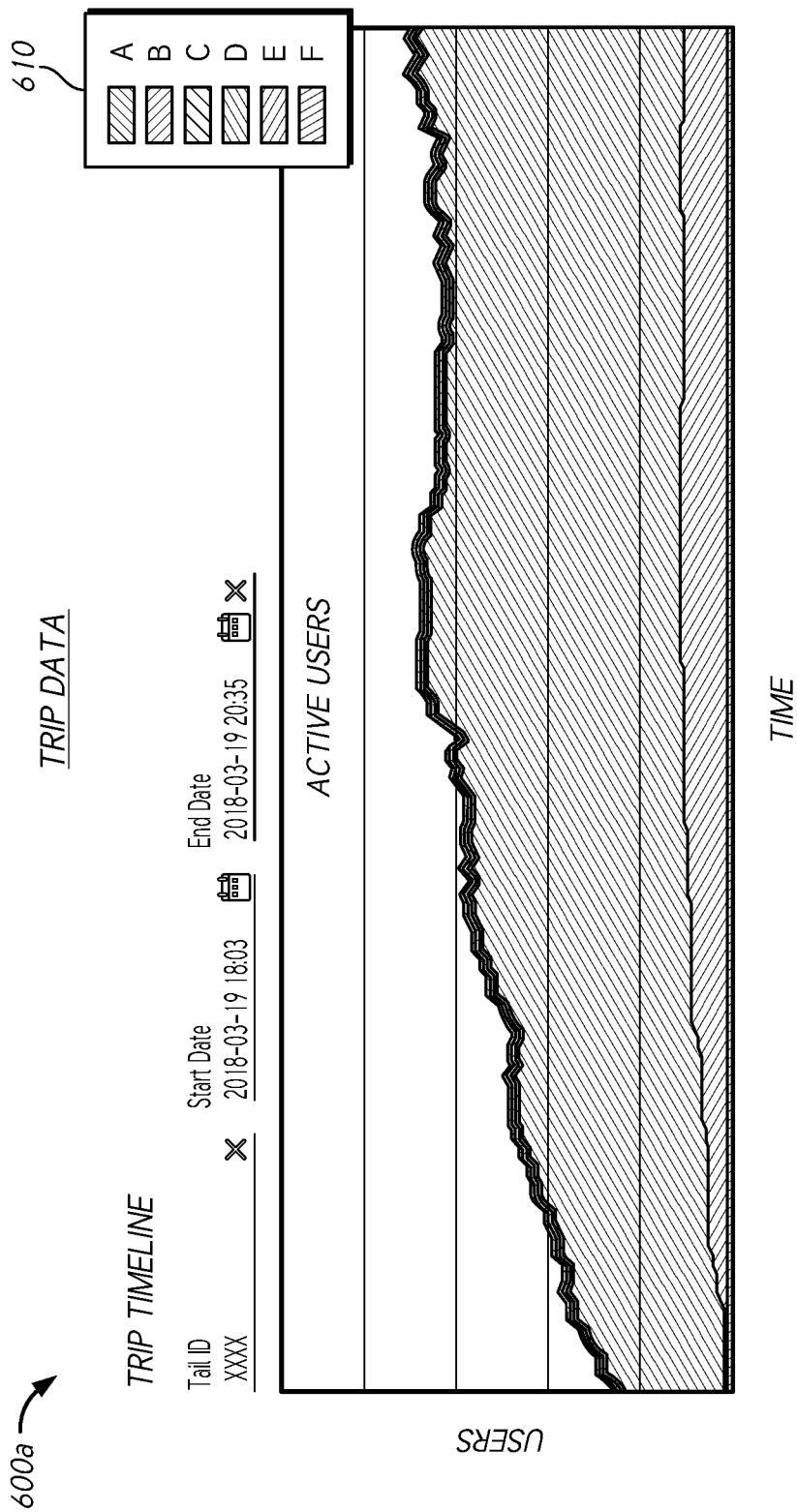
FIGS. 6A-6G illustrate example timeline graphical interfaces, which may represent one or more of a variety of types of trip data in accordance with one or more embodiments.

Selecting a trip identifier (e.g., trip identifier 406 in FIG. 4) may cause generation of trip data graphical interface data representing a set of trip-specific communication service data for a selected trip. That is, for example, in response to receiving an indication of user input associated with a trip identifier, in some embodiments, an on-ground server or other system or entity may generate graphical interface data representing a set of trip data, as described in detail herein. FIGS. 6A-6G illustrate example graphical interface timelines, which may represent one or more of a variety of types of trip data. As shown in Figured 6A-6G, types of trip data may include a number of active users (FIG. 6A), connectivity status (FIG. 6B), data rate (FIG. 6C), data usage (FIG. 6D), ping latency (FIG. 6E), ping success (FIG. 6F), and/or load time (FIG. 6G). Each illustrated timeline interface may represent statistical values over a period of time of interest. The period of time of a timeline may represent a set duration of time (e.g., a duration of a trip), or may represent a customized time range. In some embodiments, the time range may be divided into multiple points in time, and each point in time may have an associated statistical value represented in the timeline. As shown in FIG. 6A, a user may provide user input to select a start date/time and/or an end date/time. An interface representing the timeline may be generated to include a vehicle identifier for the vehicle represented by the vehicle data. In some embodiments, users may input different vehicle identifiers at the trip interface 600a to view statistics for different vehicles.

FIG. 6A illustrates a trip timeline graphical interface 600a representing a number of user devices accessing any of one or more communication service services 610 at each point in time during the specified time range. In some embodiments, a "user device" may be any client device accessing a network service of the one or more services. For example, a user device may be a PED belonging to a passenger of a vehicle, a network communication server on-board the vehicle (e.g., a server for managing subscriptions to the communications service or a server collecting communications service statistics), or a media server (e.g., providing in-flight entertainment content, or the like, to users), among others. Each user device may be associated with one or more communication services. In certain embodiments, communication services may include multiple levels of service that personal user devices may connect to by accessing a web portal, selecting a service, and in some cases paying a fee. Services that personal user devices may connect to may include a default service, a beta or trial service, and/or a premium service, among others.

The trip timeline interface 600a may be useful for determining when a break in service may have occurred. For example, if a portion of time in the illustrated time range shows no, or relatively few, connected users, it may be determined that there was a service issue during that period of time. The timeline may be zoomable to allow for focusing on certain portions of time. By zooming in, individual data points in the timeline may be clearer for viewing.

Figure 6B:
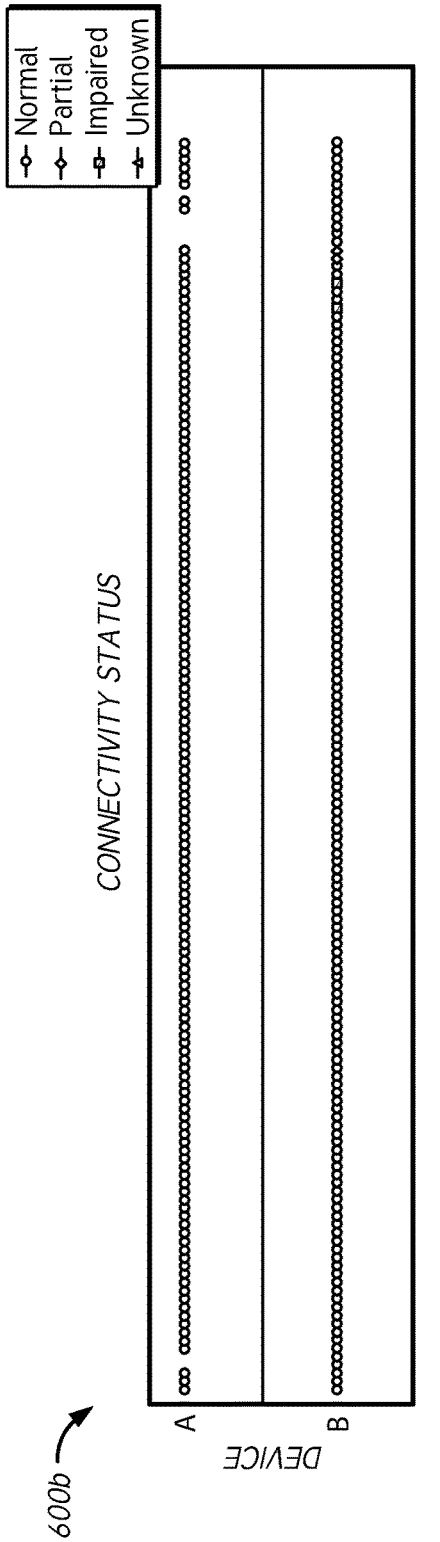

FIG. 6B illustrates a connectivity status timeline graphical interface 600b for one or more devices. In the example shown in FIG. 6B, the connectivity status timeline shows two devices ('A,' 'B'). However, more devices or a single device may be represented in other examples. For each device, the timeline may represent any "pings" received from the device. The term "ping," as used herein, may refer to any signal or communication transmitted at, or received from, a computing device over a network. Each ping may have an associated level which may be determined based on a quality of the ping. Example levels may include normal, partial, impaired, and/or unknown, among others. Each ping may be represented in the timeline based on the associated level. For example, a normal ping may be represented by a circle shape, a partial ping may be represented by a diamond shape, an impaired ping may be represented by a square shape, and an unknown ping may be represented by a triangle shape. However, such shape assignments are provided as examples only, and different levels may be represented by any suitable or desirable shape. Furthermore, ping levels may be associated with any other visual features, for example colors or shapes other than those listed above.

Figure 6C:
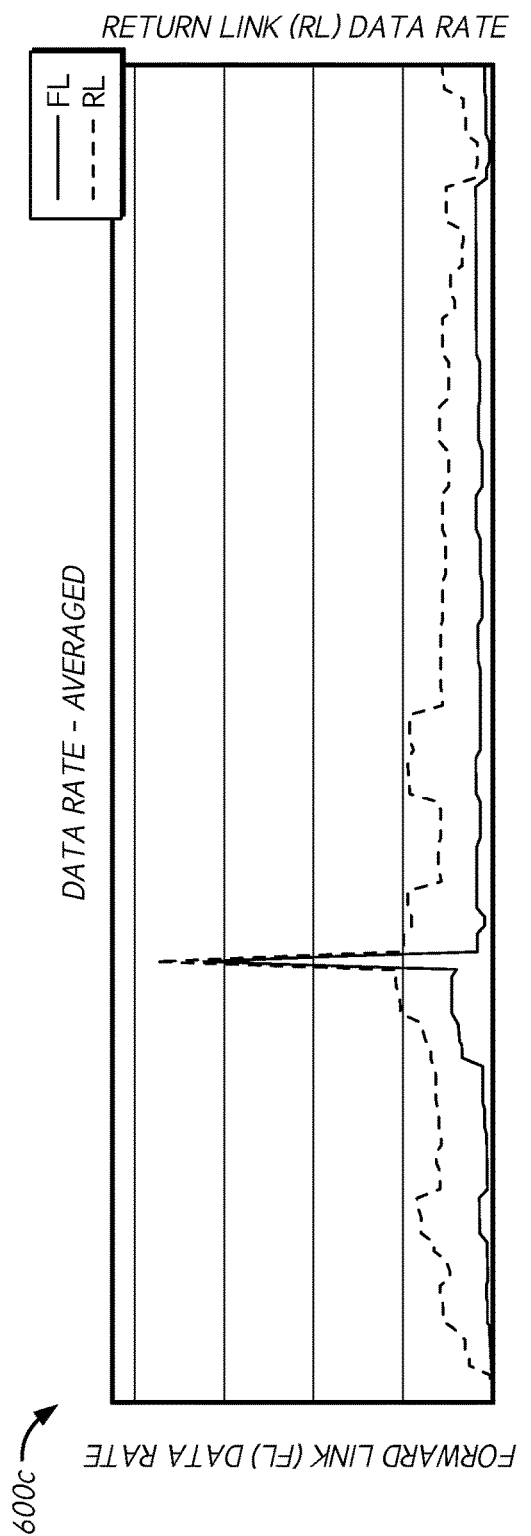

FIG. 6C illustrates a data rate timeline graphical interface 600c. The term "data rate," as used herein, may refer to a speed at which data is transferred within a computing device and/or between computing devices of a network. Data rate may be measured by a number of bytes (or kilobytes) per second, and can be averaged across devices. Data rate may be measured by multiple measuring devices, for example a server and/or a modem on-board a vehicle. Measurements may be collected and downloaded to an on-ground server when service is available. In some embodiments, data rate measurements may be compared to threshold and/or target values and various statuses (e.g., overall vehicle status) as described herein may be modified based on the comparisons.

The timeline interface 600c may represent one or both of a forward link (FL) data rate and a return link (RL) data rate over a specified period of time. A FL data rate may refer to a data rate for transmitting data from an on-ground server to a vehicle. In some embodiments, FL data may be transmitted from the on-ground server to a satellite, then from the satellite to a server on the vehicle, then from the on-board server to a user device on the vehicle. FL data may generally be relatively greater in amount than return link data. RL data may refer to data transmitted (e.g., a request for a video or other media) from an on-board device to an on-ground server. For example, from a user device to an on-board server, from the on-board server to a satellite, and from the satellite to the on-ground server.

Figure 6D:
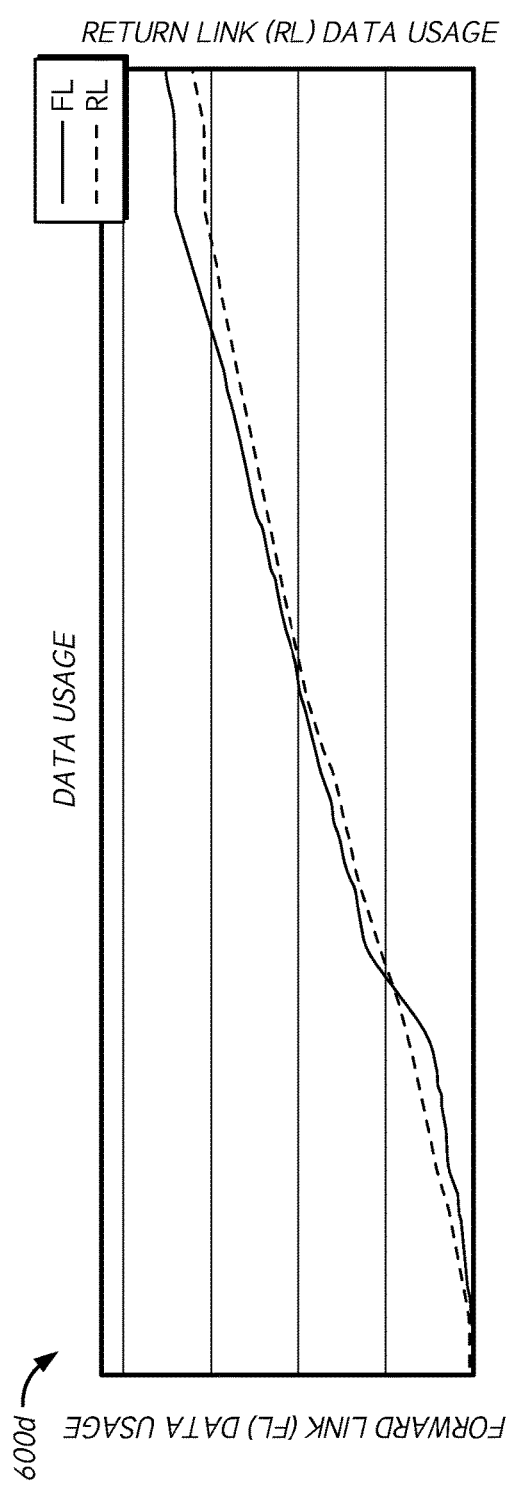

FIG. 6D illustrates a data usage timeline graphical interface 600d, which may represent a total amount of data usage over a period of time. In some embodiments, data usage amounts may be aggregated or accumulated over the course of a flight or other period of time. As shown in FIG. 6D, data usage may be collected for both forward link (FL) data rate and return link (RL) data rate.

Figure 6E:
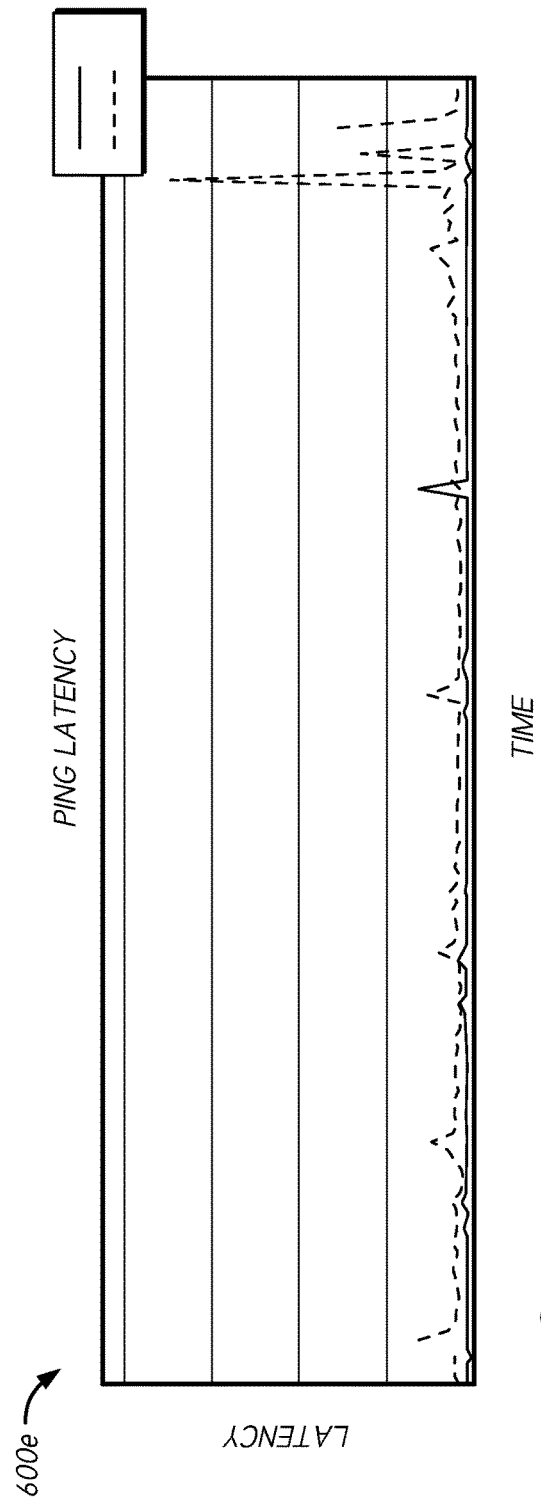

FIG. 6E illustrates a ping latency timeline graphical interface 600e. The term "ping latency," as used herein, may refer to an amount of time required to receive a response following a transmitted ping. The interface 600e illustrates an example ping latency timeline for two devices ('A,' 'B'). However, ping latency interfaces 600e in accordance with the present disclosure may represent data for any number or type of devices. In some embodiments, measured ping latency values may be compared to threshold and/or target values and various statuses (e.g., overall vehicle status) as described herein may be modified based on the comparisons.

Figure 6F:
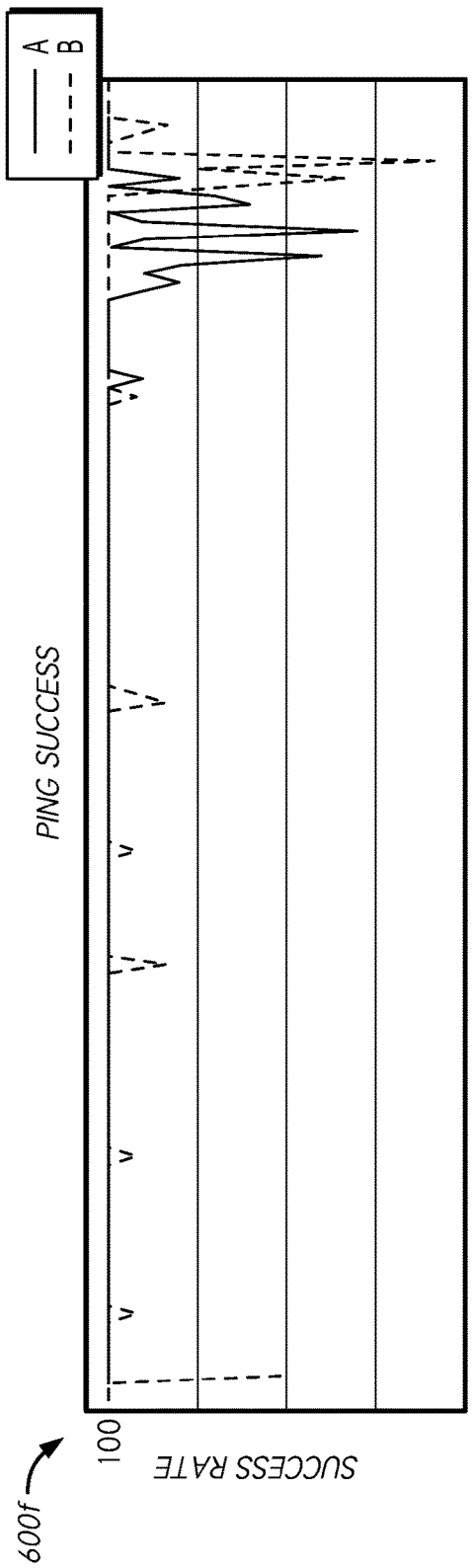
Figure 6G:
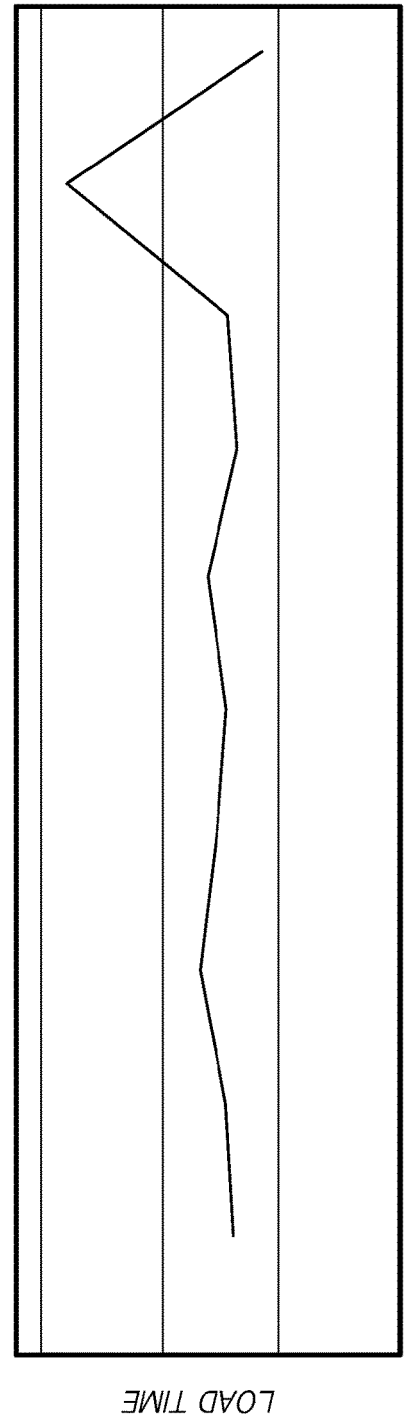

FIG. 6F illustrates a ping success timeline graphical interface 600f. The ping success timeline interface 600f may provide a success rate at various points in time. Success rate may be represented by a percentage measurement indicative of a percentage of times a response was received following a transmitted ping. In some embodiments, ping success may be averaged over a period of time. For example, a ping may be transmitted every few seconds and the number of transmitted pings over a period of one or more minutes may be divided by the number of responses to the transmitted pings.

Ping success may be compared to a threshold value during a given period of time. For example, there may be a threshold value for ping success over an entire flight. Accordingly, a number of transmitted pings over the course of the flight may be divided by the number of responses to the transmitted pings to determine an overall ping success for the flight. The overall ping success may then be compared to a threshold ping success value to determine a pass or fail status for the flight. In some embodiments, various statuses (e.g., overall vehicle status) as described herein may be modified based on comparisons to the threshold value.

FIG. 6G illustrates a load time timeline graphical interface 600g, which provides a measurement of load times over a given time range. In some embodiments, load times may be determined at periodic intervals during the period of time. Multiple load time measurements may be made using common data sets to promote consistency between results. For example, multiple load time measurements may be based on load times for the same webpage data, or webpage data from multiple websites from a group of selected websites at different times. A web page may be first copied to the communication system and served from an on-board server or on-ground server of the communication system for measurement purposes rather than from external origin web servers to avoid introducing issues associated with external web servers. The measured load times may be compared to threshold load times and various statuses (e.g., overall vehicle status) as described herein may be modified based on the comparisons. Load time measurements may include load times for a variety of data types, for example flash page content, static content, and dynamically loaded content.

Communication Service Monitoring Processes

Figure 7:
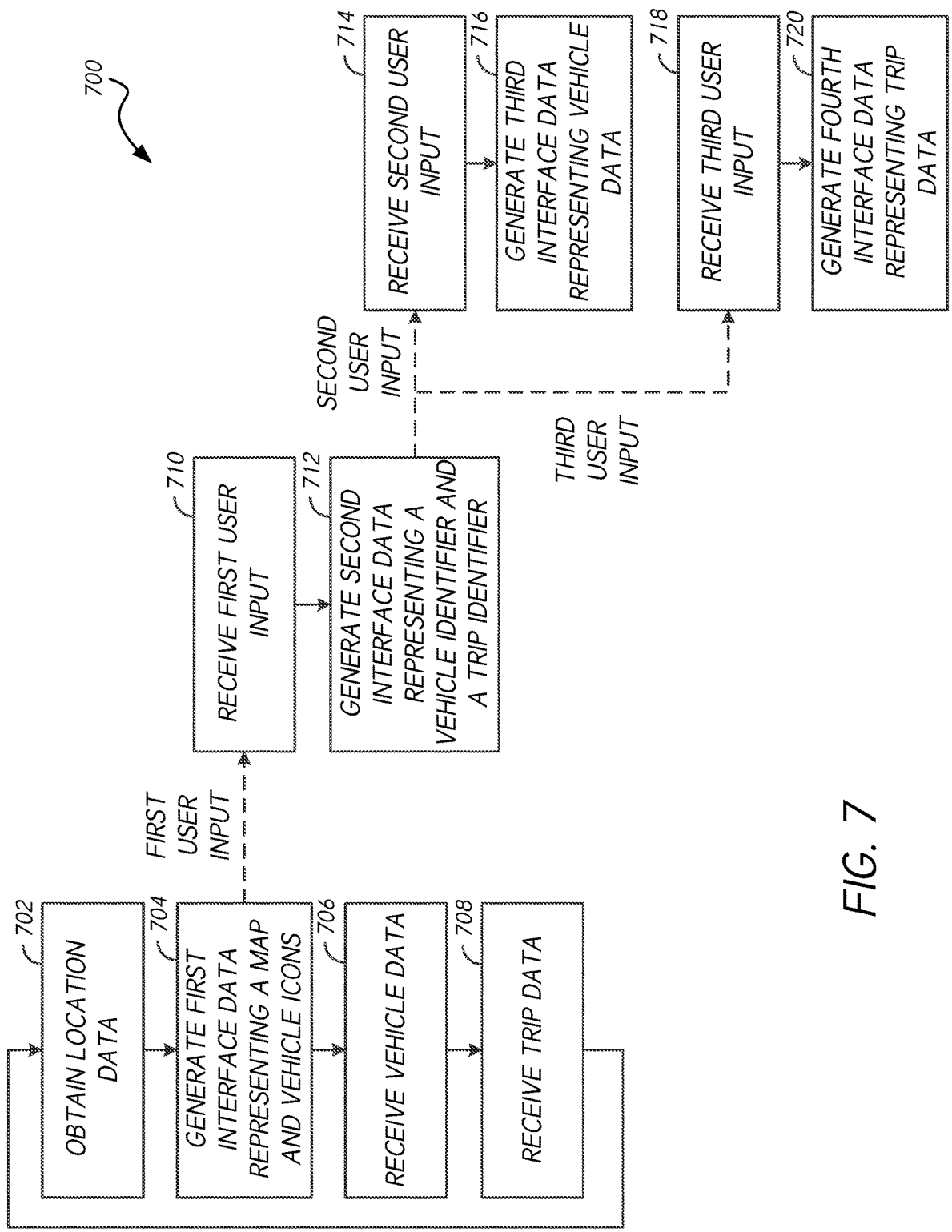
FIG. 7 illustrates a process for monitoring a network communication service in accordance with one or more embodiments.

FIG. 7 illustrates a process 700 for monitoring a network communication service in accordance with one or more embodiments of the present disclosure. Steps of the process 700 may be performed by control circuitry of an apparatus for monitoring a network communication service onboard a vehicle. For example, the process 700 may be performed at least in part by an on-ground communication service monitoring server, such as the on-ground server 125 of FIG. 1 or the on-ground server 225 of FIG. 2, described in detail above. In certain embodiments, the apparatus performing some or all of the process 700 may be part of an on-ground server that is configured to monitor network communication services of multiples vehicles. With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

At block 702, the process 700 involves obtaining location data indicating geographic locations of a plurality of vehicles. In some embodiments, location data for a first vehicle may be received from the first vehicle (e.g., from a server on-board the first vehicle). Alternatively, location data may be obtained from a source external to the first vehicle, for example a monitoring station or server associated with the first vehicle. In some embodiments, location data may indicate coordinates (e.g., latitude and/or longitude) of present or recent locations of the plurality of vehicles. Location data may also include altitude data and/or general location data (e.g., nearest major city).

At step 704, the process 700 involves generating first graphical interface data. The first graphical interface data may represent a map of a geographic area, for example the continental United States, or a portion thereof or other geographic region of the world. The graphical interface data may further represent a plurality of vehicle icons. Each of the plurality of vehicle icons may be at positioned on the map based on the obtained location data and may correspond to a respective geographic location of one of the plurality of vehicles. The plurality of vehicle icons may include any of a variety of visual features, which may include an image of a vehicle. In some embodiments, the image of the vehicle may be oriented to represent a direction of travel of the corresponding vehicle as determined based on the obtained location data. For example, comparing the obtained location data to previously obtained location data for a corresponding vehicle of the vehicle icon may indicate a direction of travel of the vehicle. Moreover, each vehicle icon may have a customizable color.

At step 706, the process 700 involves receiving a set of vehicle data from a remote server of a first vehicle of the plurality of vehicles. The vehicle data may be received through an established network connection using a network interface. In some embodiments, the vehicle data may comprise unit status data for one or more hardware devices onboard the first vehicle. The one or more hardware devices may each be components of a network communication system onboard the first vehicle. Examples of hardware devices may include one or more WAPs, an antenna power supply, an antenna, a modem, and a web server.

At least one visual feature of a vehicle icon corresponding to the first vehicle may be based on the unit status data received from the first vehicle. For example, at least one of a color and a shape of the vehicle icon may be based on the unit status data. In some embodiments, unit status data may be determined based on signals received from the individual hardware device. A hardware device may periodically transmit a signal indicating a status determined by the hardware device itself. For example, if the hardware is not experiencing any issues, the hardware device may transmit a "normal" status. If the hardware device is experience an issue (e.g., not enough power), the hardware device may transmit an "impaired" status. The signals may be sent to an onboard server. If no signal is received from a hardware device, the hardware device may be assigned an "unknown" status. If there is an issue with a signal received from a hardware device, the hardware device may be assigned an "error" status.

Unit status data may represent individual statuses for each of the hardware devices or an aggregated status for all of the hardware devices. For example, if all of the hardware devices have a "normal" status, the aggregated status of the first vehicle may be "normal". If any of the hardware devices has an "unknown" status, the aggregated status of the first vehicle may be "unknown." If all of the hardware devices have "normal" statuses except for one hardware device that has an "impaired" status, the aggregated status of the first vehicle may be "impaired." In some embodiments, a visual feature of a vehicle icon corresponding to the first vehicle may be based on the unit status data. For example, if the first vehicle has an aggregated "normal" status, the vehicle icon may be green. If the first vehicle has an aggregated "impaired" status, the vehicle icon may be red.

In some embodiments, the set of vehicle data may comprise performance data associated with a communication service provided on the first vehicle. The performance data may indicate statistical values for one or more of data rate, signal quality, latency, and packet loss rate of the network communication service. In some embodiments, the performance data may be compared to threshold values to determine a status value for the first vehicle. In certain embodiments, a visual feature of a vehicle icon corresponding to the first vehicle may be based on the performance data. For example, if each of the statistical values received in the performance data passes a threshold value, the first vehicle may have a "normal" status. In some embodiments, comparison of performance data to threshold values may be performed at an on-ground server. In other embodiments, comparison of performance data to threshold values may be performed at a server onboard the first vehicle.

At block 708, the process 700 involves receiving a set of trip data associated with a trip of the first vehicle. In some embodiments, the trip data may comprise travel route data for the first vehicle, which may include one or more service metrics of a network communication service provided on the first vehicle during the trip. The one or more service metrics may include one or more of a number of users, a connectivity status, a data rate, a data usage value, a ping latency, a ping success value, and a load time of the network communication service.

In some embodiments, each of the vehicle icons may be responsive to user inputs. For example, a user may interact with a user interface representing the first graphical user interface data by hovering over a first vehicle icon. In response to the hover event, a callout box may be generated near the first vehicle icon providing at least a portion of the vehicle data and/or trip data.

At block 710, the process 700 involves receiving a first user input associated with a first vehicle icon of the plurality of vehicle icons. The first user input may be a hover event, a click event, or other command provided by a user device.

At block 712, the process 700 involves generating second graphical interface data in response to receiving the first user input. In some embodiments, the second graphical interface data may represent a vehicle identifier. The vehicle identifier may identify a first vehicle of the plurality of vehicles associated with the first vehicle icon. For example, the vehicle identifier may be a tail number of the first vehicle. In some embodiments, the vehicle identifier may be associated with a hyperlink. For example, a user may click on the vehicle identifier to be routed to a vehicle health page providing at least some of the set of vehicle data.

In some embodiments, the second graphical interface data may represent a trip identifier for a trip associated with the first vehicle. For example, in the case of an airplane, the trip identifier may be a flight number. In some embodiments, the trip identifier may be associated with a hyperlink. For example, a user may click on the trip identifier to be routed to a trip view providing at least some of the set of trip data.

At block 714, the process 700 involves receiving a second user input associated with the vehicle identifier. The second user input may be a hover event, a click event, or other command provided by a user device.

At block 716, the process 700 involves generating third graphical interface data in response to the second user input. The third graphical interface data may represent at least a portion of the set of vehicle data. For example, the third graphical interface data may represent a vehicle health icon that comprises a visual feature (e.g., color) that is based on the aggregated unit status data. In certain embodiments, the third graphical interface data may represent a vehicle health table, case table, and/or device table as described above with respect to FIG. 5.

At block 718, the process 700 involves receiving a third user input associated with the trip identifier. The third user input may be a hover event, a click event, or other command provided by a user device.

At block 720, the process 700 involves generating fourth graphical interface data in response to receiving the third user input. The fourth graphical interface data may represent at least a portion of the set of trip data. For example, the fourth graphical interface data may represent one or more timelines indicating statistical values of performance metrics measured during a trip of a vehicle, as described above with respect to FIGS. 6A-6G.

Each of the steps of the process 700 may be iteratively performed for each vehicle of two or more of the plurality of vehicles. New location, vehicle, and/or trip data may be received on a periodic or other basis and corresponding interface data may be updated to include newly received data.

General Comments

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

Reference throughout this disclosure to "some embodiments," "certain embodiments" or "an embodiment" means that a particular feature, structure or characteristic described in connection with the embodiment can be included in at least some embodiments. Thus, appearances of the phrases "in some embodiments," "in certain embodiment," or "in an embodiment" in various places throughout this specification are not necessarily all referring to the same embodiment, and may refer to one or more of the same or different embodiments. Furthermore, embodiments disclosed herein may or may not be embodiments of the invention. For example, embodiments disclosed herein may, in part or in whole, include non-inventive features and/or components. In addition, the particular features, structures or characteristics can be combined in any suitable manner, as would be apparent to one of ordinary skill in the art from this disclosure, in one or more embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. An apparatus for monitoring a network communication system onboard a vehicle, the apparatus comprising:
a network interface; and
control circuitry configured to:
obtain location data indicating geographic locations of a plurality of vehicles within a geographic area;
generate first graphical interface data simultaneously representing:
a map of the geographic area; and
a plurality of vehicle icons, each of the plurality of vehicle icons being at a position on the map corresponding to a respective geographic location of one of the plurality of vehicles;
in response to receiving an indication of a first user input associated with a first vehicle icon of the plurality of vehicle icons, generate second graphical interface data representing:
a vehicle identifier identifying a first vehicle of the plurality of vehicles associated with the first vehicle icon; and
a trip identifier for a trip associated with the first vehicle;
establish a network connection with an onboard server of the first vehicle using the network interface;
receive a set of vehicle data from the onboard server via the network connection;
receive a set of trip data associated with a communication service provided by the onboard server on the first vehicle during the trip;
in response to receiving an indication of a second user input associated with the vehicle identifier, generate third graphical interface data representing the set of vehicle data; and
in response to receiving an indication of a third user input associated with the trip identifier, generate fourth graphical interface data representing the set of trip data.

2. The apparatus of claim 1, wherein the set of vehicle data comprises unit status data for one or more devices used to provide the communication service onboard the first vehicle.

3. The apparatus of claim 2, wherein the one or more devices comprises one or more of a wireless access point, an antenna power supply, an antenna, a modem, a transceiver, and a server.

4. The apparatus of claim 2, wherein a visual feature of the first vehicle icon is based on the unit status data.

5. The apparatus of claim 4, wherein the visual feature comprises at least one of a color and a shape of the first vehicle icon.

6. The apparatus of claim 2, wherein:
the control circuitry is further configured to aggregate the unit status data for the one or more devices;
the second graphical interface data represents a vehicle health icon; and
a visual feature of the vehicle health icon is based on the aggregated unit status data.

7. The apparatus of claim 1, wherein the set of trip data comprises travel route data for the first vehicle.

8. The apparatus of claim 7, wherein the travel route data comprises one or more service metrics of the communication service provided on the first vehicle during the trip.

9. The apparatus of claim 8, wherein the one or more service metrics includes one or more of a number of users, a connectivity status, a data rate, a data usage value, a ping latency, a ping success value, and a load time.

10. The apparatus of claim 1, wherein the vehicle identifier is associated with a first hyperlink and the trip identifier is associated with a second hyperlink.

11. The apparatus of claim 1, wherein the set of vehicle data comprises performance data associated with the communication service provided on the first vehicle during one or more previous trips of the first vehicle.

12. The apparatus of claim 11, wherein a visual feature of the first vehicle icon indicates a status level of the performance data.

13. The apparatus of claim 12, wherein the status level is based on one or more of a data rate, a signal quality value, a latency, and a packet loss rate of the communication service.

14. The apparatus of claim 1, wherein the control circuitry is further configured to iteratively perform, for the plurality of vehicles, obtaining of respective vehicle data.

15. A method of monitoring a network communication service, the method comprising:
    obtaining location data indicating geographic locations of a plurality of vehicles within a geographic area;
    generating first graphical interface data simultaneously representing:
        a map of the geographic area; and
        a plurality of vehicle icons, each of the plurality of vehicle icons being at a position on the map corresponding to a respective geographic location of one of the plurality of vehicles;
    in response to receiving an indication of a first user input associated with a first vehicle icon of the plurality of vehicle icons, generating second graphical interface data representing:
        a vehicle identifier identifying a first vehicle of the plurality of vehicles associated with the first vehicle icon; and
        a trip identifier for a trip associated with the first vehicle;
    establishing a network connection with an onboard server of the first vehicle using a network interface;
    receiving a set of vehicle data from the onboard server via the network connection;
    receiving a set of trip data associated with a communication service provided by the onboard server on the first vehicle during the trip;
    in response to receiving an indication of a second user input associated with the vehicle identifier, generating third graphical interface data representing the set of vehicle data; and
    in response to receiving an indication of a third user input associated with the trip identifier, generating fourth graphical interface data representing the set of trip data.

16. The method of claim 15, wherein the set of vehicle data comprises unit status data for one or more devices associated with the communication service onboard the first vehicle.

17. The method of claim 16, wherein the one or more devices comprises one or more of a wireless access point, an antenna power supply, an antenna, a modem, a transceiver, and a server.

18. The method of claim 16, wherein a visual feature of the first vehicle icon is based on the unit status data.

19. The method of claim 16, further comprising aggregating the unit status data for the one or more devices, wherein:
    the second graphical interface data represents a vehicle health icon; and
    a visual feature of the vehicle health icon is based on the aggregated unit status data.

20. The method of claim 15, wherein:
    the set of trip data comprises travel route data for the first vehicle;
    the travel route data comprises one or more service metrics of the communication service provided on the first vehicle during the trip.

21. The method of claim 15, wherein:
    the set of vehicle data comprises performance data for the communication service provided on the first vehicle during one or more previous trips of the first vehicle; and
    at least one visual feature of the first vehicle icon indicates a status level of the performance data.

22. The method of claim 21, wherein the status level is based on one or more of a data rate, a signal quality value, a latency, and a packet loss rate of the network communication service.

23. A system for monitoring a network communication service, the system comprising:
    a plurality of onboard servers, each onboard server of the plurality of onboard servers being disposed onboard a vehicle of a plurality of vehicles; and
    a subsystem comprising:
        a display device; and
        an on-ground server configured to:
            establish a network connection with each onboard server of the plurality of onboard servers;
            obtain location data indicating respective geographic locations of the plurality of vehicles within a geographic area;
            generate, for display on the display device, first graphical interface data simultaneously representing:
                a map of the geographic area; and
                a plurality of vehicle icons, each of the plurality of vehicle icons being at a position on the map corresponding to a respective geographic location of one of the plurality of vehicles;
            in response to receiving an indication of a first user input associated with a first vehicle icon of the plurality of vehicle icons, generate, for display on the display device, second graphical interface data representing:
                a vehicle identifier identifying a first vehicle of the plurality of vehicles associated with the first vehicle icon; and
                a trip identifier for a trip associated with the first vehicle;
            receive a set of vehicle data from a first onboard server onboard the first vehicle via the network connection;
            receive a set of trip data associated with a communication service provided by the first onboard server during the trip;
            in response to receiving an indication of a second user input associated with the vehicle identifier, generate, for display on the display device, third graphical interface data representing the set of vehicle data; and
            in response to receiving an indication of a third user input associated with the trip identifier, generate, for display on the display device, fourth graphical interface data representing the set of trip data.

24. The system of claim 23, wherein the display device is remotely located from the on-ground server.

25. The system of claim 23, wherein the set of vehicle data comprises unit status data for one or more devices configured to be used to provide the communication service onboard the first vehicle.

26. The apparatus of claim 1, wherein the communication service is provided for use by one or more media clients onboard the first vehicle.

27. The method of claim 15, wherein the communication service is provided for use by one or more media clients onboard the first vehicle.

28. The system of claim 23, wherein the communication service is provided for use by one or more media clients onboard the first vehicle.

29. The apparatus of claim 1, wherein:
the first vehicle icon is selectable via user input; and
the first user input is at the first vehicle icon.

30. The method of claim 15, wherein:
the first vehicle icon is selectable via user input; and
the first user input is at the first vehicle icon.

31. The system of claim 23, wherein:
the first vehicle icon is selectable via user input; and
the first user input is at the first vehicle icon.

* * * * *